United States Patent [19]

Sundberg

[11] 4,011,369
[45] Mar. 8, 1977

[54] ELECTRIC STORAGE BATTERY ELECTRODE, AND METHOD FOR ITS MANUFACTURE

[75] Inventor: Erik G. Sundberg, Nol, Sweden
[73] Assignee: Aktiebolaget Tudor, Sundbyberg, Sweden
[22] Filed: Feb. 20, 1975
[21] Appl. No.: 551,327
[30] Foreign Application Priority Data
Feb. 22, 1974 Sweden .......................... 7402348
[52] U.S. Cl. .......................... 429/140; 429/164; 429/238
[51] Int. Cl.² .......................... H01M 2/16
[58] Field of Search .......... 136/43, 54, 55, 63, 136/69; 429/140, 164, 238

[56] References Cited
UNITED STATES PATENTS

| | | | |
|---|---|---|---|
| 1,243,371 | 10/1917 | Willard | 136/54 |
| 1,479,527 | 1/1924 | Wilson | 136/55 |
| 2,026,193 | 12/1935 | Smith | 136/43 |
| 3,080,616 | 3/1963 | Imamura | 136/55 X |
| 3,082,280 | 3/1963 | Sundberg et al. | 136/43 |
| 3,207,632 | 9/1965 | Dickover et al. | 136/55 X |

*Primary Examiner*—Anthony Skapars
*Attorney, Agent, or Firm*—Burns, Doane, Swecker & Mathis

[57] ABSTRACT

A tube plate for a storage battery is formed from a grid of conductive rods that are surrounded by active material held in place by a sheath of insulating material. The conductive rods are centered in their respective sheaths by centering fins solely lying in the plane of the electrode. The conductive rods are centered in the perpendicular direction by placing the electrode in a jig which has cylindrical channels for receiving the sheaths. In each channel, two rows of needle-like elements are provided which penetrate the sheath and engage the rod surface during the period when the active material in powder form is loaded into the electrode.

10 Claims, 4 Drawing Figures

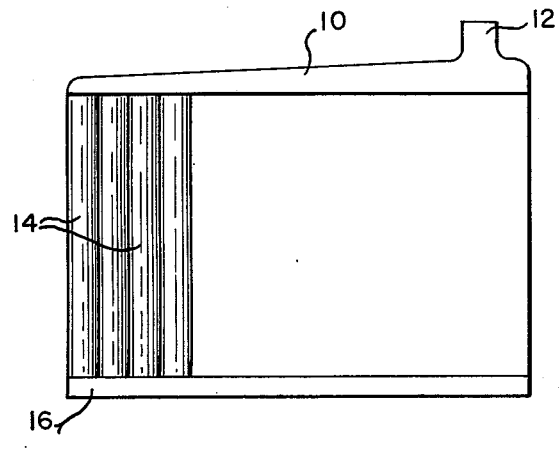
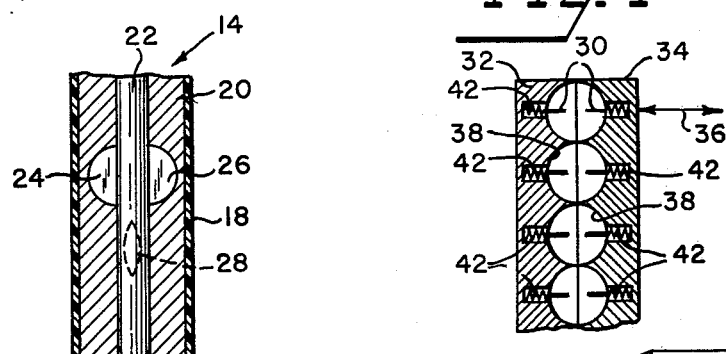
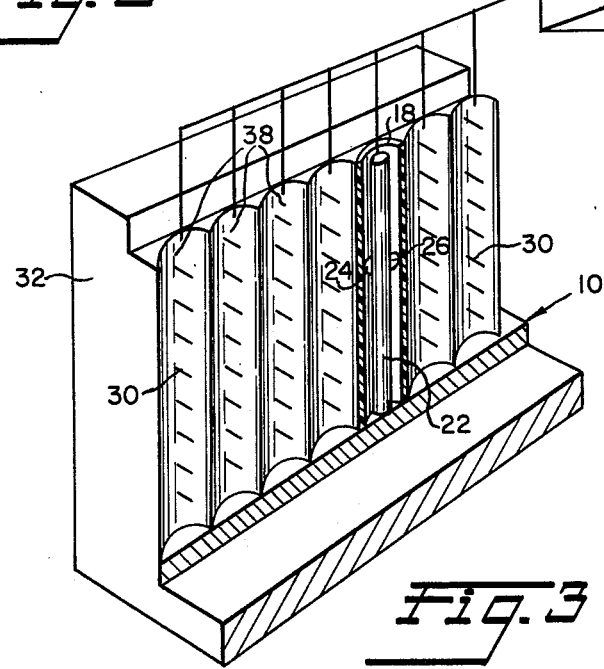

ELECTRIC STORAGE BATTERY ELECTRODE, AND METHOD FOR ITS MANUFACTURE

The present invention relates to a tube electrode for electric storage batteries. More specifically, the invention concerns a novel electrode and method for manufacture of such electrode.

Tube electrodes traditionally comprise a grid of electrically conductive material with the grid having a number of parallel rods of conductive material joined by a common conductor. The rods are surrounded by electrochemically active electrode material which in turn is surrounded by an electrically insulating sheath that is permeable to the electrolyte. The electrodes of the invention are characterized in that there is a new configuration for the conductive rod, whereby unanticipated advantages are attained.

Tube electrodes are used in various kinds of storage batteries, with acid as well as alkaline electrolytes. The configuration of the electrode has been essentially the same, however, no matter what the type of battery. Lead storage batteries having liquid electrolytes may be mentioned as one of the most important examples. In such batteries, the conductive rod generally consists of a lead-antimony alloy, but it may also be another suitable lead alloy. Tube electrodes are used almost exclusively for the positive electrodes, and the active material in a fully charged electrode is then $PbO_2$. The surrounding sheath may be of various materials. Such sheaths are described, for example, in U.S. Pat. Nos. 3,725,130 and 3,265,535.

Electric conductors that stick down in each tube, the so-called rods, are traditionally furnished with bar centering devices. These devices, called guide fins, are generally made as a homogeneous part of the rods in lead storage batteries, as illustrated in U.S. Pat. No. 3,265,535. It has also been proposed that the fins be made of plastic and fixed in some way on the conductive rods such, for example, as described in U.S. Pat. No. 3,082,280. It has likewise been suggested that the bars be made without guide fins, and that instead, in the charging of the active material into the tube, the bar be centered in the tube with a device that is pulled up out of the sheath as the active material is delivered. Devices thus far known for such electrode manufacture have been much too complicated and unsuited for application to any commercially practical extent.

The guide fins customarily placed on the rods extend in two planes, on the one hand, in a plane that coincides with that of the electrode, and, on the other hand, perpendicular thereto. The fins are often disposed in groups of four and four, shifted slightly with reference to each other along the length of the tube, with a greater distance to the next group. In casting the grid, the guide fins constitute a considerable complication. On the one hand, they entail an added expense for casting the grid, first of all because it is technically difficult to manage cavities in the mold for the fins that are disposed in a plane perpendicular to the electrode. Further, the flow of molten metal into the mold in casting the grid can be unfavorably affected by these periodically successive cavities. And because of their relatively large number, the fins cause a noticeable increase in the amount of grid material, and thereby also increase the cost of the grid.

From the standpoint of electrochemistry, the guide fins have been regarded as unsuitable, as explained in U.S. Pat. No. 3,082,280. Surprisingly, it has now been found, however, that the negative influence of the guide fins that are in the plane coinciding with that of the electrode is so insignificant that it can be regarded as negligible. The negative effects, therefore, can be ascribed wholly to the fins that are in the plane perpendicular to the plane of the electrode.

When a positive electrode in a lead storage battery functions, in charging or discharging, there is a conversion of the active material to lead dioxide and lead sulfate, respectively. Along with this, however, there are a number of side reactions and the essential one in this connection, occurring primarily during charging when the active material is mainly converted to lead dioxide, is oxidation of the lead to lead dioxide. At this time, the lead in the conductors is oxidized. However, the process is slow and the conducting rod dimensions are chosen with reference to the anticipated length of life. The formed lead dioxide has greater bulk than the lead from which it is formed. It follows that when the sheath that surrounds the electrode tube is not sufficiently yieldable, the active material exerts a gradually increasing pressure on the tube sheath. It has also been found that this expansion of the active material is most pronounced at the places along the tube where the guide fins that face the grid of opposite polarity are located. The tube sheath is therefore considerably stressed at these locations.

It is accordingly an object of the invention to provide a novel electrode where rod centering fins in the plane perpendicular to the plane of the electrode are eliminated, whereby in all essentials, the special effect of corrosion in the zone of the fins disappears. This in spite of the fact that the fins coinciding with the plane of the electrode remain. Since the change cannot be explained in terms of change of the surface exposed to corrosion, another explanation has to be sought. The probable one is that there is a so-called peak effect at the fins. This rests on the fact that the conductive material from which the fins are formed, as compared to the surrounding material, has significantly higher conductivity and lower resistance to the passage of current. The fins perpendicular to the plane of the electrode that are turned toward the nearest electrode of opposite polarity are thus loaded with a higher current density than the bar as a whole. This, in turn, can be assumed to lead to a significantly more rapid localized corrosion than in the rest of the electrode. It follows that this concentration of current leads to an uneven use of the active material in the electrode. It has now been shown that these drawbacks surprisingly can be avoided by elimination of the fins that are perpendicular to the plane of the electrode while the other fins remain.

Another object invention is to provide a novel method of centering the rod in the sheath during the charging of the electrode with active material. In the manufacture of an electrode, the grid rods and connecting bridge member, usually at the top, are molded as an integral piece. Traditionally, the rods have centering fins that lie both in the plane of the plate and in planes perpendicular to the plate. In accordance with this method, the fins that are disposed in the perpendicular direction are omitted. This simplifies considerably the molding operation as discussed above.

The grid is thereafter positioned to allow the preformed sheath to be inserted over the free end of each individual conductive rod, with the centering fins in the plane of the electrode serving to initially maintain the proper position of the sheath about the rod. The grid with the sheath in place is then positioned in a two-piece jig having hollow cavities to receive and hold the sheath in place. The cavities have a row of sharp pins that are on opposite sides of each sheath and lie in a plane perpendicular to the plane of the electrode. These pins penetrate through the sheath wall and serve to center the rod in the direction perpendicular to the plane of the electrode while the electrode is being charged with active material. Thereafter, the pins are removed from the sheath wall.

A further object is to provide a better compaction of active material through vibration of the electrode during the filling operation. With multiple pin contact along the length of the conductive rods, the vibration imparted to the electrodes through the supporting base is more effectively transmitted to the regions where the active material accumulates thereby to reduce the likelihood of the active material to bridge over or leave voids.

These and other objects of the invention will become more fully apparent from the claims, and from the description as it proceeds in connection with the appended drawings wherein:

FIG. 1 is a view in elevation of an electrode embodying the present invention;

FIG. 2 is an elevation in partial section which shows the interior construction of a tube as used in the electrode of FIG. 1;

FIG. 3 is a view of part of the jig used in the manufacture of the electrode of FIG. 1 and shows rows of sharp needles which penetrate the electrode sheath and engage the surface of the rod for centering the rod within the sheath during the filling of the sheath with active material; and FIG. 4 is a partial top plan view in section of the jig of FIG. 3.

With continued reference to the drawings, the tube plate shown in FIG. 1 traditionally consists of an upper strip of conductive material 10 having a joining lug 12 and being connected to a group of tubes 14 that are also supported on the lower end by a bar 16, which may be of either conductive or insulating material. The number of tubes 14 in a plate generally ranges between about 10 and 25 per electrode.

FIG. 2 shows in section the interior of a tube which includes a sheath 18, active material 20, and the center conductive rod 22. On the conductive rod 22 and guide fins 24 and 26 which lie in the plane of the electrode. The dashed lines 28 indicate the position of a centering fin which has been used in the earlier electrode construction and disposed in a plane perpendicular to the plane of the electrode, but which are omitted in accordance with the present invention. It is a characteristic of the present invention that there are guide fins 24 and 26 on the conductive rod 22 only in the plane of the electrodes.

In the manufacture of the electrode, the conductive rods 22 and bar 10 with lug 12 are cast as an integral unit. Since the centering fins 24 and 26 are traditionally a homogeneous part, the molding operation is greatly simplified by the deletion of the fins customarily used, which lie in a plane perpendicular to the plane of the plate and indicated in dotted lines 28. After removal of the grid from the mold, the next step is to place sheath 18 over each of the rods 22 and active material to be charged in the space between the rods 22 and the sheath 18.

If the rods 22 are not located centrally in the active material, uneven electrical current loads in different parts of the electrode result and there is a consequent poor utilization of the active material. In the manufacture of electrodes according to the invention with guide fins 24 and 26 lying only in the plane of the electrode, it is therefore necessary to center each rod 22 in its sheath 18 in the plane perpendicular to the electrode.

In accordance with the invention, the centering of rod 22 is accomplished by use of thin, sharp needles 30 which are thrust through sheath 18 to engage the surface of conductor 22, including fins 24 and 26.

Referring to FIGS. 3 and 4, the electrode with each rod 22 surrounded by sheath 18 is located in the apparatus which consists of a jig having two parts 32 and 34, with one part being movable relative to the other, as illustrated in FIG. 4 by the arrow 36. FIG. 3 shows diagrammatically only half of the jig which is essentially symmetrical. In each of plates 32 and 34 there are a number of semi-cylindrical surfaces or grooves 38 located to correspond to the position of an electrode tube 14 when installed in the plate of FIG. 1. The electrode may advantageously be placed in an inverted position with the bar 10 at the lower end and the open end of the tubes 14 exposed to active material from a supply 40 which is adapted for use in filling each tube 14 with the powder material.

The electrode with rods 22 and sheaths 18 in surrounding position is placed in the apparatus of FIG. 3 and the two plates 32 and 34 are brought together so that the thin, sharp needles 30 are thrust through sheath 18 to engage opposite sides of rod 22 without damage to or alteration of the form of the sheath. This assures centering of the conductive rods 22 in the sheath 18 during charging of the active material.

It has been found that, on occasions, the needles strike portions of the sheath which are too hard to be easily penetated. To avoid this disadvantage, it is therefore desirable to have the needles 30 movably mounted in the plates 32 and 34 so that at a specific force, they can move longitudinally in a direction away from the intended position of the electrode. This is also desirable to avoid a situation where the force from a fixed needle might be so great as to cause deformation or deflection of the sheath 18 against conductive rod 22. Therefore, in FIG. 4, each of the needles 30 is shown mounted with its one end supported by a suitable resilient member such as a small spring 42.

The length of the needles 30 is chosen so that they are somewhat less than the radius of the groove 38 since the sharp end goes only to the surface of rod 22. The axis of each needle 30 is perpendicular to the plane of the electrode plate 10 so that the two rows of needles 30 lie in a plane that passes through the axis of rod 22 and is perpendicular to the plane of the electrode plate.

To achieve complete filling of the tube cavities, it is customary to cause the electrodes to vibrate during charging with active material, a substance or powder with different properties. The term powder here means any material with such particle size that it can pass down into the space between the rod 22 and the sheath 18. Since the rheological properties of this material are often relatively poor, it is customary to shake the electrode during the charging. The electrodes as a rule consist of material with good vibration-damping capabilities, however. It has therefore turned out unexpectedly that in the manufacturing process of the invention, there is an improvement in the uniformity of the charging of the electrodes. This is due to the fact that the vibrations are transmitted to the electrode rods 22 which are in contact with the powder while the rods 22 are directly connected by needles 30 to the jig and vibrating base. The vibration is hereby transmitted to the electrodes also at the constant surfaces between electrode and jig. Since the needle-like rod centering elements are fixed in the jig, the transfer of vibrations occurs at a large number of points.

Whether or not the electrode is vibrated, it has nonetheless been shown to be desirable to have the needle-like elements fixed in the jigs, because there is greater precision in electrode manufacture this way. It has likewise been shown to be desirable to have the needles movably fastened in the jigs so that at a specific force, the needles can move longitudinally in a direction away from the intended position of the electrode.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A plate electrode for a storage battery containing a plurality of tubes connected together to define a plane for said electrode with each of said tubes comprising an outer sheath of electrical insulating, electrolyte-permeable material filled with active material and a rod of electrically conducting material disposed in the center thereof and characterized in that for centering the conductive rod, said rod is provided solely with centering fins formed integrally with the rod which project radially from the center of the rod, with all of said centering fins lying solely in a direction substantially parallel to the plane of said electrode.

2. A method for the manufacture of a tube plate type electrode for a storage battery comprising:
    forming a conductive rod for each tube belonging to an electrode with centering fins located solely in a plane substantially parallel to the plane of the electrode;
    providing a preformed sheath of electrical insulating, electrolyte-permeable material;
    inserting said rod into said sheath;
    providing a plurality of sharply pointed, needle-like elements that are aligned in parallel relationship with pointed ends in a row;
    centering the rods within the sheath by inserting said needle-like elements through the sheath into engagement with the surface of said rod while filling the sheath with active material, said needle-like elements lying in a plane substantially perpendicular to the plane of the electrode; and
    removing said needle-like elements after the active material has been placed in sheaths to form the tubes for said electrode.

3. The method of claim 2 wherein the needle-like elements are mounted in a jig with spring means permitting axial movement of the needle-like element in response to a force in excess of a predetermined amount.

4. The method of claim 3 including the further step of vibrating the electrode during the filling operation through vibration simultaneously of the needle-like elements.

5. The method of claim 2 including the further step of vibrating the electrode during the filling operation through vibration simultaneously of the needle-like elements.

6. A method for the manufacture of a tube plate type electrode for a storage battery comprising:
    forming a grid of parallel conductive rods, one for each tube belonging to an electrode, with each rod having centering fins located solely in a plane substantially parallel to the plane of the electrode;
    installing over each of said rods a separate sheath of electrical insulating, electrolyte-permeable material;
    providing a jig containing parallel channels of a size and shape for receiving the sheaths mounted on said rods, said channels each containing a plurality of sharply pointed needle-like elements in substantial parallel alignment and extending in a plane substantially perpendicular to the plane of the electrode;
    placing said grid in operative relationship with said jig so that each conductor is centered in its respective sheath in a direction perpendicular to the plane of the electrode during charging of the active material into the sheaths by penetration of said needle-like elements through the sheath from opposite sides to be in engagement with surfaces on opposite sides of said rod.

7. The method of claim 6 wherein the needle-like elements are mounted in said jig for individual axial movement in response to a force on the needle in excess of a predetermined amount.

8. The method of claim 7 further comprising the step of vibrating the jig during the charging of the sheaths with the powdery active material while the electrode rods are in contact with the ends of said needle-like elements.

9. The method of claim 6 further comprising the step of vibrating the jig during the charging of the sheaths with the powdery active material while the electrode rods are in contact with the ends of said needle-like elements.

10. Device for the manufacture of tube plate electrodes which is used to hold the electrode during delivery of the active material into the individual tubes while the rods are maintained centered in their respective sheaths, characterized in that the device is made of two flat elements with grooves shaped and spaced to receive the tube sheaths, and in that in the bottom of said grooves there are needle-like elements projecting perpendicularly to the plane of the electrode when inserted in the device, the length of said needle-like elements being less than the depth of the respective grooves, and the flat elements being movable toward and away from each other whereby the needle-like elements are adapted to penetrate through the sheaths and engage conductive rod surfaces on opposite sides to center the rod in the sheath in a direction perpendicular to the plane of the electrode.

* * * * *